United States Patent [19]

Miyazaki

[11] Patent Number: 5,746,381
[45] Date of Patent: May 5, 1998

[54] FISHING REEL WITH CLUTCH MECHANISM UTILIZING AN ENGAGING PROTRUSION AND ENGAGING RECESSES

[75] Inventor: Takeo Miyazaki, Tokyo, Japan

[73] Assignee: Daiwa Seiko, Inc., Tokyo, Japan

[21] Appl. No.: 659,239

[22] Filed: Jun. 5, 1996

[30] Foreign Application Priority Data

Jun. 7, 1995 [JP] Japan .................... 7-200343

[51] Int. Cl.[6] .............................................. A01K 89/015
[52] U.S. Cl. ....................... 242/261; 192/69.63; 192/70.14
[58] Field of Search .................................. 242/260, 261, 242/262, 259; 403/578, 379; 192/69.63, 69.7, 66.1, 66.21, 70.14, 70.15, 107 R, 48.92, 52.2

[56] References Cited

U.S. PATENT DOCUMENTS

| 3,796,464 | 3/1974 | Hansen et al. ............... 403/378 X |
|---|---|---|
| 4,918,843 | 4/1990 | Kiesewetter et al. .......... 403/378 X |
| 5,068,986 | 12/1991 | Jones ........................ 403/379 X |
| 5,116,072 | 5/1992 | Swenson ..................... 403/378 X |
| 5,123,609 | 6/1992 | Noda ......................... 242/261 |
| 5,205,511 | 4/1993 | Morimoto ..................... 242/261 |
| 5,362,010 | 11/1994 | Takamatsu .................... 242/261 |

FOREIGN PATENT DOCUMENTS

| 3-58967 | 6/1991 | Japan . | |
| 2221249 | 1/1990 | United Kingdom ........... 403/379 |

*Primary Examiner*—Daniel P. Stodola
*Assistant Examiner*—Emmanuel M. Marcelo
*Attorney, Agent, or Firm*—Sughrue, Mion, Zinn, Macpeak & Seas, PLLC

[57] ABSTRACT

A fishing reel having a clutch mechanism including end planes (7g, 7i) formed, respectively, next to engaging recesses (7e, 7f) with which an engaging protrusion (8) rotated in the fishing line releasing direction comes into impact contact. The end planes (7g, 7i) form an increased thickness portion which enhances the mechanical strength of the engaging recesses (7e, 7f). Since the mechanical strength of the engaging recesses (7e, 7f) is enhanced, edge portions of the engaging recesses (7e, 7f) are not deformed or scraped away by the impact force caused when the engaging protrusion (8) collides with the engaging recesses (7e, 7f). Therefore, it is possible for the engaging protrusion (8) to engage the pinion engaging recesses (7e, 7f) smoothly, normally and positively.

8 Claims, 11 Drawing Sheets

FISHING REEL WITH CLUTCH MECHANISM UTILIZING AN ENGAGING PROTRUSION AND ENGAGING RECESSES

BACKGROUND OF THE INVENTION

1. Field of the Invention

The present invention relates to a fishing reel of the type having a spool supported by bearings on both sides of the spool. The fishing reel of the instant invention has an improved clutch mechanism in which the mechanical strength of an engaging recess formed on an end face of a pinion is enhanced.

2. Related Art

One example of a conventional fishing reel of the type having a spool supported by bearings on both ends is disclosed in Japanese Unexamined Utility Model Publication No. 3-58967. In this reel, a spool is rotatably supported between side plates of the reel body. A clutch mechanism is provided so that the spool can be changed over between a freely rotating condition of the spool and a winding condition. The reel also has a pin-shaped engaging protrusion capable of engaging with an engaging recess formed on one side of a pinion. The engaging protrusion protrudes outward in the radial direction of the spool shaft.

The above described conventional spool operates as follows. After the clutch has been changed over to the freely rotating condition, the spool is reversed so that the fishing line is let out and the tackle is released to a predetermined point, and then the clutch is returned to the winding condition. An oblique guide surface extends from an edge portion of one engaging recess of the pinion to an edge portion of another engaging recess so that the engaging recesses of the pinion can be smoothly engaged with the engaging protrusion of the spool shaft while the spool is being reversed in the direction of releasing the fishing line.

The following problems may be encountered in the above arrangement. When the spool is changed over from the freely rotating condition to the winding condition, an impact force is applied by the protrusion of the spool shaft on the edge portion of the engaging recess of the pinion. Therefore, a thickness of the upper portion of the engaging recess of the pinion is reduced by the oblique guide surface, and a portion from the engaging recess of the pinion to the upper portion is deformed and scraped away. As a result, the engaging protrusion of the spool shaft is not normally, positively engaged with the engaging recess of the pinion, and the clutch does not function in a normal condition. Therefore, it is impossible to release and wind the fishing line smoothly.

The conventional reel described above has the following problems which the instant invention is directed to solving. An edge portion of the engaging recess of the pinion is deformed or scraped away by an impact force caused between the protrusion of the spool shaft and the engaging recess of the pinion. Due to the above problem, the engaging protrusion of the spool shaft can not be normally, positively engaged with the engaging recess of the pinion, the clutch can not be operated in a normal condition, and the fishing line can not be smoothly released and wound.

SUMMARY OF THE INVENTION

The present invention is directed to solving the above mentioned problems. An object of the present invention is to provide a fishing reel supported by bearings on both sides in which the mechanical strength of the engaging recess formed on one end face of the pinion is enhanced so that the engaging recess can be smoothly engaged with the engaging protrusion and the fishing line can be smoothly released and wound in the process of fishing.

In order to accomplish the above objects, the fishing reel of the present invention is provided with a clutch mechanism that comprises: a pin-shaped engaging protrusion perpendicularly attached to a shaft of a spool rotatably supported between side plates of a reel body; a pair of engaging recesses attached to an end face of a pinion of a drive mechanism, the pair of engaging recesses being arranged perpendicularly to the axis of the pinion, the pair of engaging recesses being capable of engaging with the engaging protrusion, wherein the clutch mechanism is changed over between a free rotating condition and a winding condition of the spool; and two sets of end planes and oblique faces continuously formed between the engaging recesses.

DETAILED DESCRIPTION OF THE PREFERRED EMBODIMENTS

Figure 1:
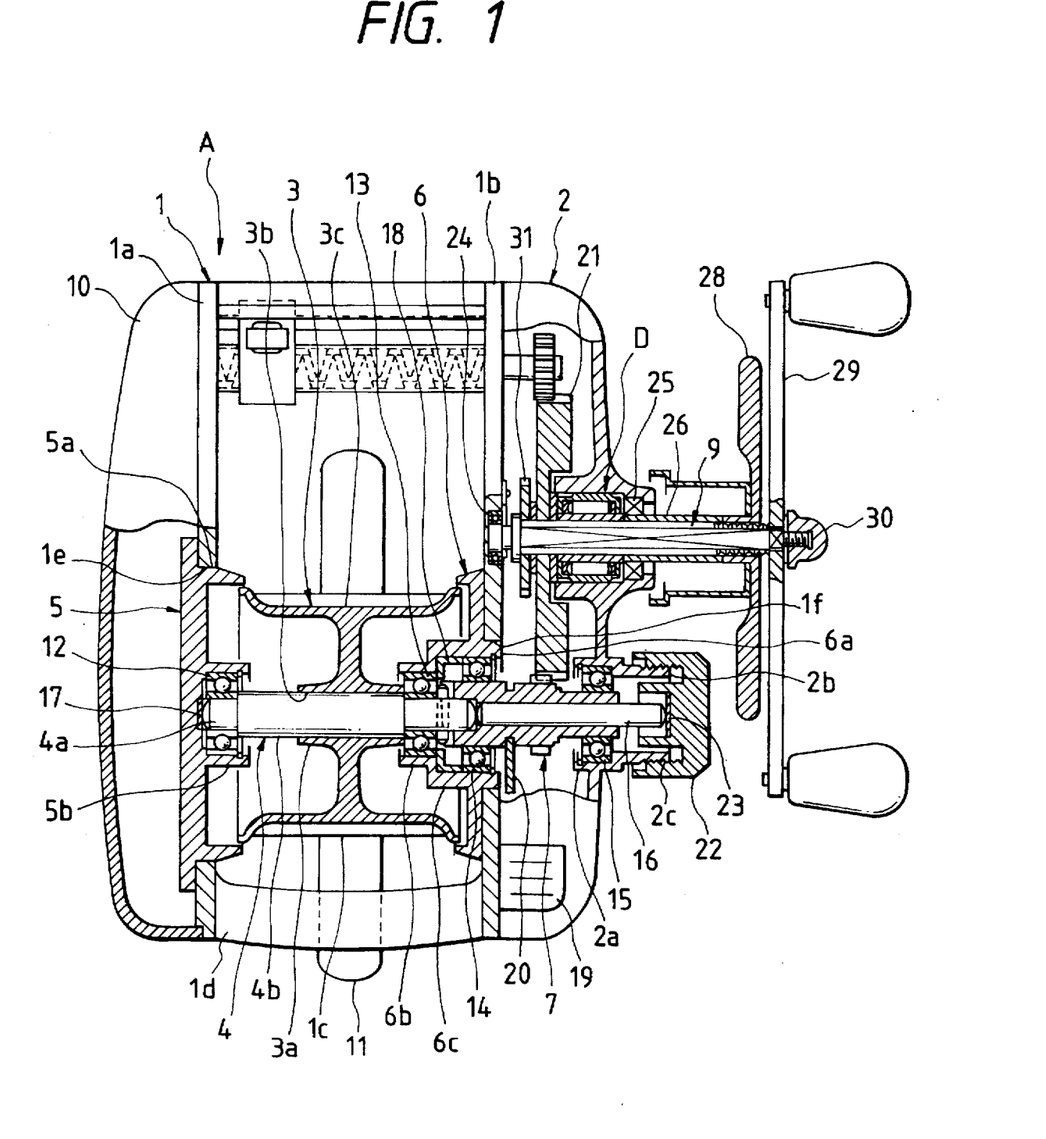
FIG. 1 is a cross-sectional plan view of a first embodiment, showing a primary portion of the fishing reel supported by bearings on both sides.
Figure 2:
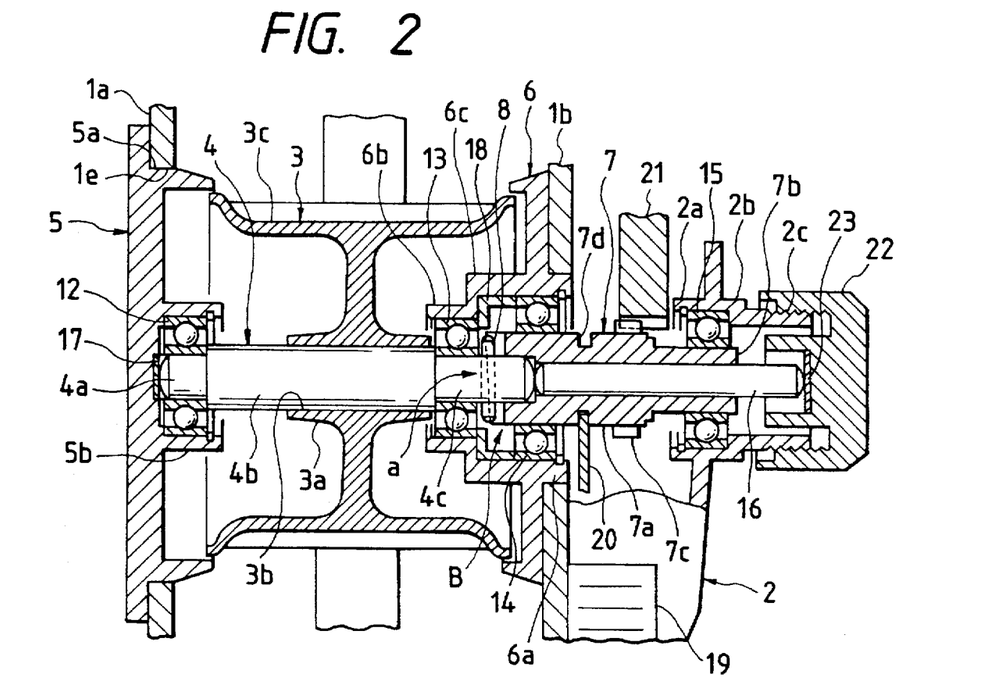
FIG. 2 is an enlarged cross-sectional plan view showing a primary portion of the clutch mechanism in which the spool is connected with the pinion.
Figure 3:
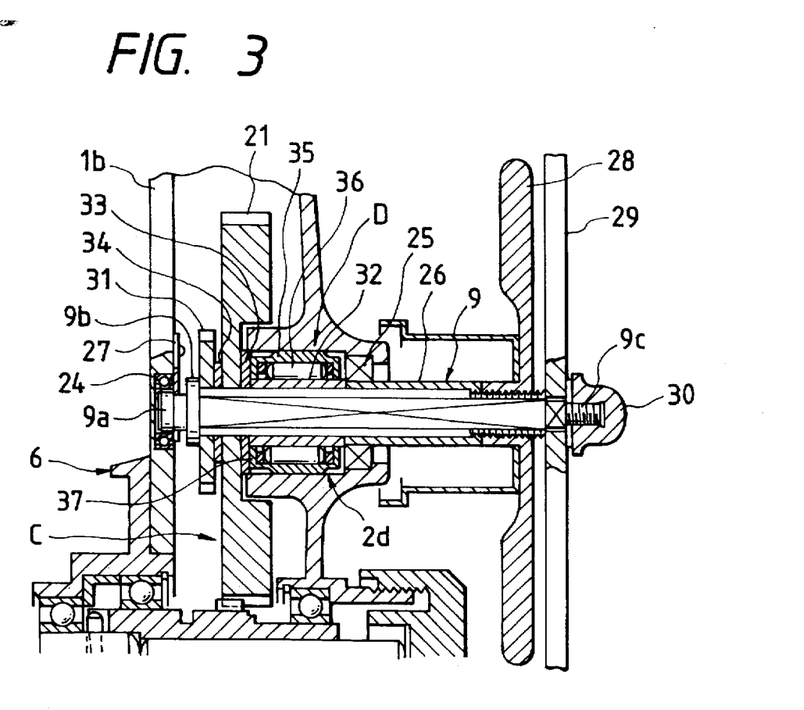
FIG. 3 is an enlarged cross-sectional plan view showing a primary portion of the drive mechanism.
Figure 4:
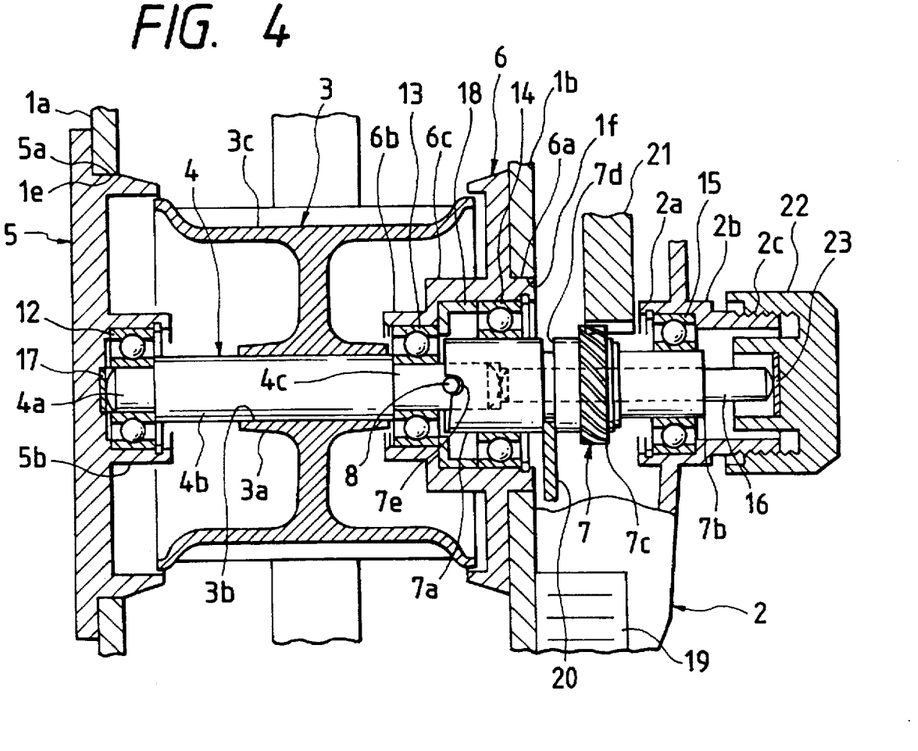
FIG. 4 is an enlarged cross-sectional plan view showing a primary portion of the clutch mechanism when the spool shaft is rotated by an angle of 90°.
Figures 5A, 5B:
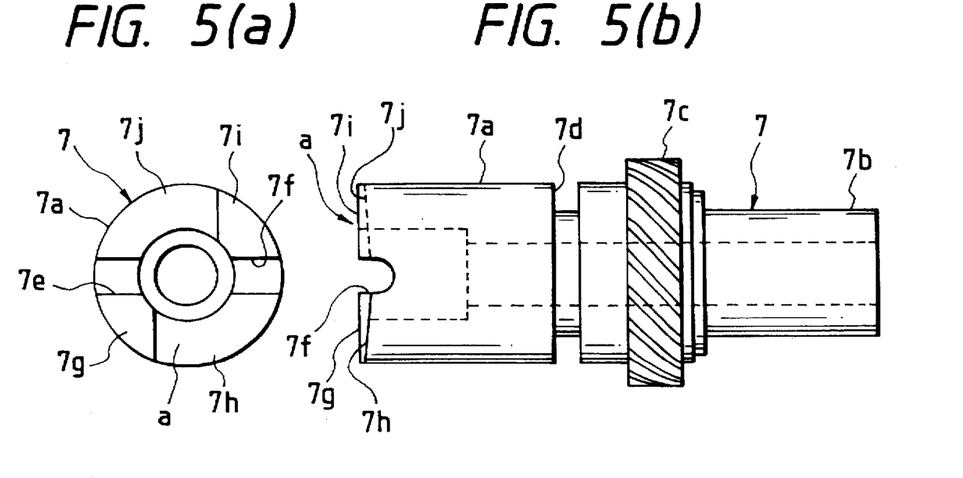
FIG. 5(a) is an enlarged front view of one end face of the pinion.
FIG. 5(b) is an enlarged plan view of the pinion.
Figure 6:
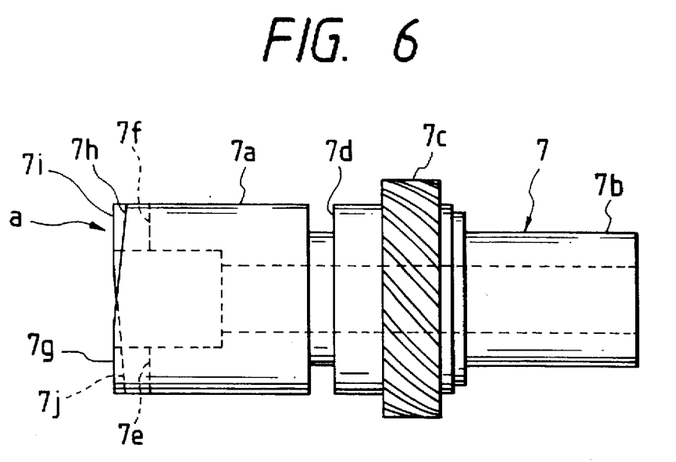
FIG. 6 is another enlarged plan view of the pinion.
Figure 7:
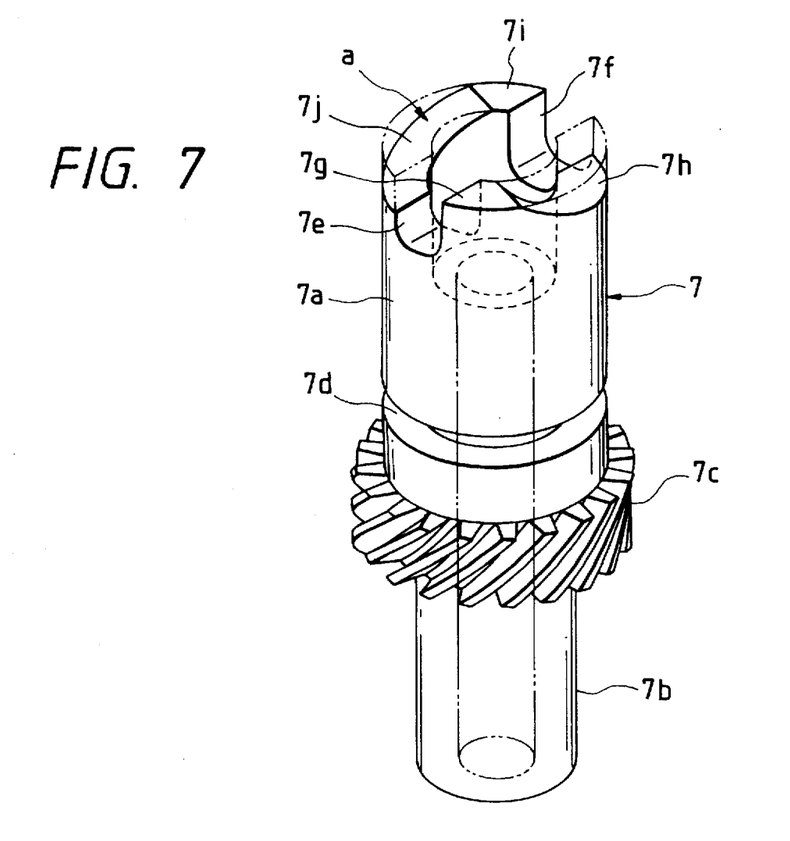
FIG. 7 is an enlarged perspective view of the pinion.
Figure 8:
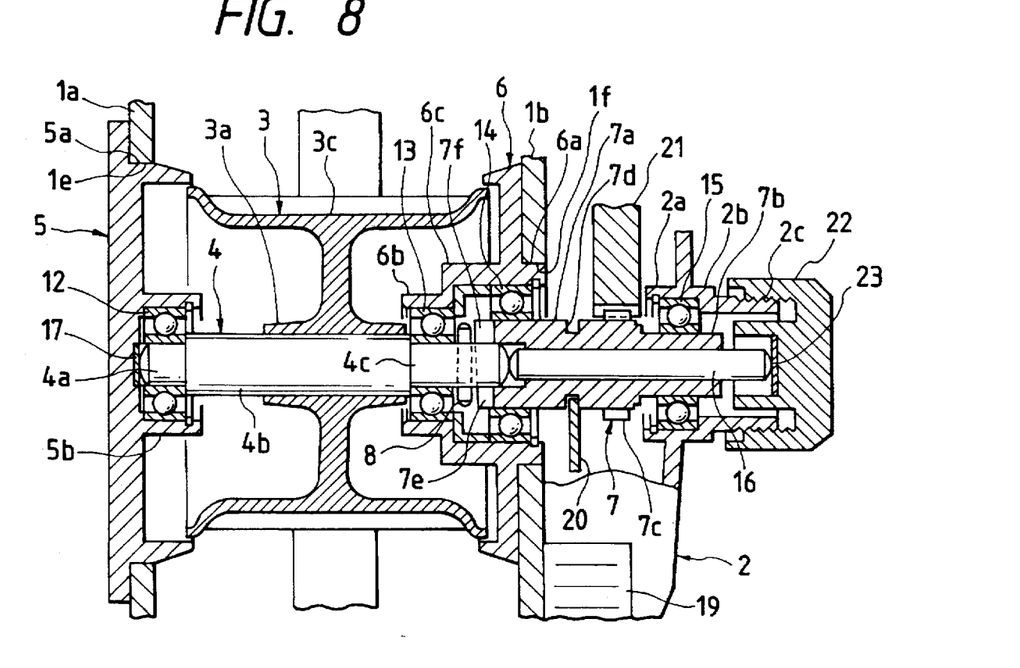
FIG. 8 is an enlarged cross-sectional plan view showing a primary portion of the clutch mechanism in a condition in which the spool can be freely rotated with respect to the pinion.
Figure 9:
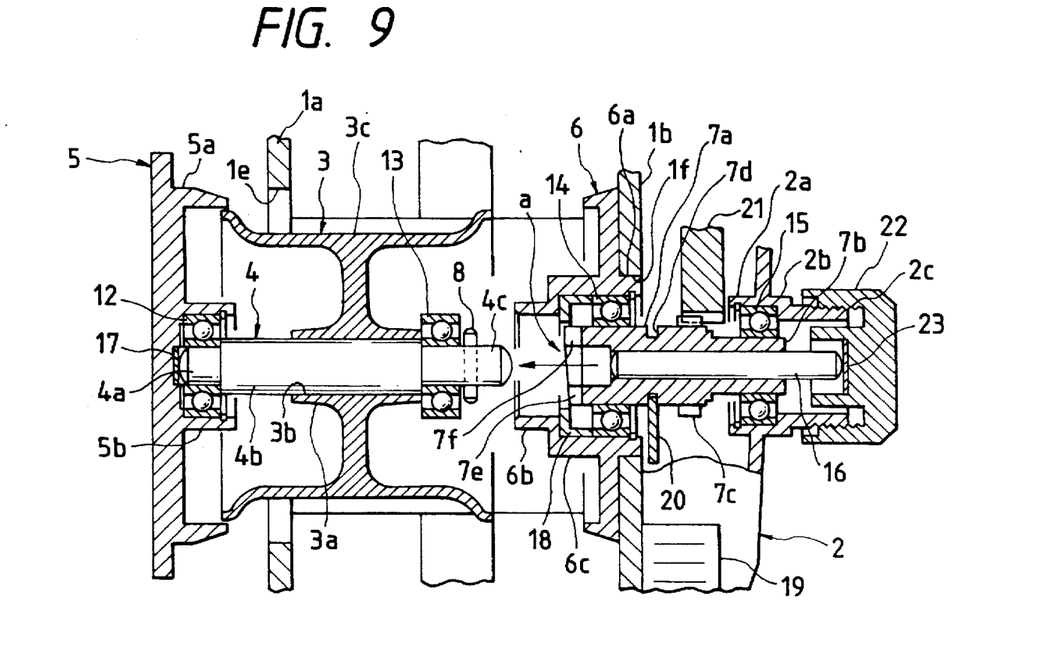
FIG. 9 is an enlarged cross-sectional plan view showing a primary portion of the clutch mechanism in a condition in which the spool is drawn out from the reel body.

Referring to an embodiment shown in the accompanying drawings, the present invention will be explained below. FIGS. 1 to 9 are views showing the first embodiment of the present invention. FIG. 1 is a cross-sectional plan view showing a primary portion of the fishing reel supported by bearings on both sides. FIG. 2 is an enlarged cross-sectional plan view showing a primary portion of the clutch mechanism in which the spool and the pinion are in the "ON" condition. FIG. 3 is an enlarged cross-sectional plan view showing a primary portion of the drive mechanism. FIG. 4 is an enlarged cross-sectional plan view showing a primary portion of the clutch mechanism in which the spool shaft is rotated by an angle of 90°. FIG. 5(a) is an enlarged front view showing an end face of the pinion. FIG. 5(b) is an enlarged plan view showing the pinion. FIG. 6 is another enlarged plan view of the pinion. FIG. 7 is an enlarged perspective view of the pinion. FIG. 8 is an enlarged cross-sectional view showing a primary portion of the clutch mechanism in which the spool can be freely rotated with respect to the pinion. FIG. 9 is an enlarged cross-sectional plan view showing a primary portion of the clutch mechanism in a condition in which the spool is drawn out from the reel body.

Reel body A is composed of a side frame 1, and right and left side plates 2, 10, respectively, which are attached to the right and left side frames 1b, 1a, respectively, of the side frame 1.

The side frame 1 is arranged as follows. The right side frame 1b, the left side frame 1a, a support (not shown), a fixing plate 1c of the reel leg 11, and a finger mounting lever 1d are integrated into one body, and the right and left side frames 1b, 1a are held in parallel with each other.

A spool 3 is rotatably supported between both side frames 1a and 1b. A spool shaft 4 to which the spool 3 is fixed is rotatably supported by one bearing 12 attached to the spool cover 5 of the side frame 1a, and by another bearing 13 attached to the spool cover 6 of the side frame 1b.

A bearing 14 is provided on the right side of the bearing 13 attached to the spool cover 6. A bearing 15 is provided on the right side plate 2. The bearing 14 supports a large diameter shaft tube 7a of the pinion 7, and the bearing 15 supports a small diameter shaft tube 7b of the pinion 7, so that the shaft tubes 7a, 7b can be freely rotated and moved in the axial direction.

A pushing shaft lever 16 is engaged in a center hole of the pinion 7 in such a manner that the pushing shaft lever 16 can be moved in the axial direction.

The spool shaft 4 includes: a small diameter portion 4a supported by the bearing 12; a large diameter portion 4b to which the spool 3 is fixed; and a small diameter outwardly extending end portion 4c protruding toward the pinion 7. One end of the pushing shaft lever 16 comes into contact with an end of the outwardly extending end portion 4c.

An engaging protrusion 8 comprising a pin of the clutch mechanism B is fixed to the small diameter outwardly extending end portion 4c.

A center hole 3b is formed at the center shaft portion 3a of the spool 3, and the large diameter portion 4b of the spool shaft 4 is inserted into and fixed to the center hole 3b.

The fishing line (not shown) is wound around a fishing line winding drum 3c of the spool 3.

An outer circumference of the cover 5a of the spool cover 5 is detachably engaged with a through-hole 1e of the side frame 1a and attached to the outside of the side frame 1a of the spool cover 5 by screws.

A cylindrical portion 5b is formed at the inner center of the spool cover 5. A thrust bearing 17 and the bearing 12 are provided in the cylindrical portion 5b.

A cylindrical portion 6a is formed on the outside of the spool cover 6. The cylindrical portion 6a is engaged with and fixed to a through-hole 1f of the side frame 1b.

Inside the spool cover 6 are cylindrical portions 6b and 6c which are formed stepwise and integrated into one body. The bearing 13 is detachably engaged inside the cylindrical portion 6b. A cylindrical spacer 18 and a bearing 14 are provided inside the cylindrical portion 6c on the right of the cylindrical portion 6b. The cylindrical spacer 18 and the bearing 14 are locked so that they can not be disconnected.

Pinion teeth 7c and a circumferential groove 7d are formed on the outer circumference of the large diameter shaft tube 7a of the pinion 7.

A pair of U-shaped engaging recesses 7e, 7f are formed on one end face "a" of the large diameter shaft tube 7a of the pinion 7. These recesses 7e, 7f form part of the clutch mechanism B, and they are arranged perpendicularly to the axis of the shaft tube 7a.

As shown in FIGS. 5 to 7, the end plane 7g and the oblique plane 7h are formed to extend continuously between the engaging recesses 7e and 7f on one side of the end face "a", and the end plane 7i and the oblique plane 7j are formed to extend continuously between the engaging recesses 7e and 7f on the other side of the same end face "a".

When an operating plate 20 is operated by the clutch operating lever 19, the engaging protrusion 8 of the spool shaft 4 is engaged with and disengaged from the engaging recesses 7e, 7f of the pinion 7, and the operating plate 20 is engaged in the circumferential groove 7d.

The pinion gear 7c of the pinion 7 is meshed with a drive gear 21 which is engaged with the drive shaft 9. This arrangement forms the drive mechanism C.

A shaft tube portion 2a protrudes into the interior of the right side plate 2, and the bearing 15 is attached to the shaft tube portion 2a. A shaft tube portion 2b protrudes out beyond the bearing 15, and a screw portion 2c is provided on the outer circumference of the shaft tube portion 2b.

The outer circumferential screw portion 2c of the shaft tube portion 2b is screwed into the inside of the cylindrical portion of an adjusting knob 22.

A thrust bearing 23 is provided inside the cylindrical portion of the inside of the adjusting knob 22. The other side of the pushing shaft lever 16 comes into contact with the thrust bearing 23.

The drive shaft 9 is supported by the bearing 24, which is arranged in the right frame 1b, and also by a plain bearing 25, which is attached to the side plate 2, via a collar 26 provided around the drive shaft 9. A flange portion 9a at one end of the drive shaft 9 on the side of the bearing 24 is locked by a locking plate 27 so that the drive shaft 9 can not be disconnected.

The collar 26 is stationarily engaged with the outer circumference of the drive shaft 9. A drag adjusting knob 28 is screwed onto an outer circumference of the drive shaft 9 outside the plain bearing portion 25. A cylindrical portion of the drag adjusting knob 28 comes into contact with the collar 26, and a handle 29 is attached to the other end 9b of the drive shaft 9 by means of a nut 30.

A clutch reversing gear 31 is engaged with the drive shaft 9 in such a manner that the clutch reversing gear 31 locks the drive shaft. The clutch reversing gear 31 comes into contact with a flange portion 9b of the drive shaft 9. A frictional plate 33, drive gear 21 and frictional plate 34 are engaged with the drive shaft 9 and arranged between the clutch reversing gear 31 and the rolling type one-way clutch D.

In this embodiment, in the clutch-off condition, the engaging protrusion 8 of the spool shaft 4 is disconnected from the engaging recesses 7e, 7f of the pinion 7, and in the clutch-on condition, the engaging protrusion 8 of the spool shaft 4 is connected with the engaging recesses 7e, 7f of the pinion 7. The clutch-off condition is changed over to the clutch-on condition as follows. When the handle 29 is rotated in a direction so that the fishing line can be wound around the outer circumference of the fishing line winding drum 3c of the spool 3, the operating plate 20 located at the releasing position is moved to the engaging position by the action of the clutch reversing gear 31, so that the engaging protrusion 8 can be engaged with the engaging recesses 7e, 7f.

A cylindrical support portion 2d, which is formed as a recess, protrudes into the plain bearing portion 25 of the side plate 2. This cylindrical support portion 2d is engaged with an outer ring 35 of the rolling type one-way clutch D in such a manner that the outer ring 35 can not be rotated in the cylindrical support portion 2d.

The rolling type one-way clutch D includes an inner ring 32, a plurality of rod-shaped rolling members 36 rotatably provided on the outer circumference of the inner ring 32, an outer ring 35, a support 37 made of synthetic resin, and a spring (not shown). The handle 29 can be rotated only in a direction in which the fishing line is wound around the spool 3, i.e., the handle 29 cannot be rotated in the reverse direction.

The fishing reel is operated as follows. In the clutch-on condition in which the engaging protrusion 8 of the spool shaft 4 is engaged with the engaging recesses 7e, 7f of the pinion 7, the handle 29 is rotated in a direction so that the fishing line can be wound around the spool 3. Then, the drive shaft 9, inner ring 32, drive gear 21, pinion 7, spool shaft 4 and spool 3 are normally rotated.

When the adjusting knob 22 is rotated to apply a brake force to the rotating spool 3, a pushing force applied to the end portion of the outwardly extending end portion 4c of the spool shaft 4 is adjusted via the pushing shaft lever 16.

Prevention of the reverse rotation of the fishing reel is conducted as follows. When the fishing line is pulled out, the spool 3 is released, and then reversed. By this reverse rotation of the spool 3, the drive shaft 9 and the inner ring 32 are reversed.

When the drive shaft 9 and the inner ring 32 are reversed, the reverse rotation is checked by the action of the rolling type one-way clutch D.

In this reverse rotation, the spool 3 is quickly stopped by the action of the rolling type one-way clutch D.

In order to change the clutch over from the clutch-on to the clutch-off condition in which the spool can be freely rotated, the operating plate 20 is operated by the clutch operating lever 19. Then, as shown in FIG. 8, the pinion 7 is moved in the axial direction, and the engaging recesses 7e, 7f of the pinion 7 are disengaged from the engaging protrusion 8 of the spool shaft 4.

The mechanical strength of the pinion 7 is maintained high when the pinion 7 on the side of the engaging recesses 7e, 7f is supported by the bearing 14. Moreover, the pinion 7 is supported by the bearings 14, 15, so that the pinion 7 is supported independently from the spool shaft 4 when it is not engaged with the pool 3. Accordingly, frictional resistance is low, and the spool shaft 4 and the pinion 7 can be independently and smoothly rotated in the freely rotating condition of the spool in which the clutch is disconnected.

The outer circumference of the other end of the spool shaft 4 and the outer circumference of one end of the pinion 7 are supported by the bearings 13, 14 attached to the cylindrical portions 6b, 6c which are integrated with each other. Accordingly, the center of the spool shaft 4 accurately coincides with the center of the pinion 7. Therefore, the engaging protrusion 8 of the spool shaft 4 can be smoothly engaged with and disengaged from the engaging recesses 7e, 7f of the pinion 7, so that the pinion 7 can be highly accurately meshed with the drive gear 21.

When the spool is changed over from the clutch-off condition, in which the spool can be freely rotated, to the clutch-on condition, the operating plate 20 is operated by the clutch operating lever 19. Then, as shown in FIGS. 1, 2 and 4, the pinion 7 is moved in the axial direction, and the engaging protrusion 8 of the spool shaft 4 is inserted into and engaged with the engaging recesses 7e, 7f of the pinion 7.

At this time, the rotating or stopping engaging protrusion 8 comes into contact with a set of end planes 7g, 7i or a set of oblique planes 7h, 7j formed on one end face "a" of the large diameter shaft tube 7a of the pinion 7, and then the engaging protrusion 8 is inserted into and engaged with the engaging recesses 7e, 7f.

When the engaging protrusion 8 is inserted into and engaged with the engaging recesses 7e, 7f, the engaging protrusion which is rotating in the direction in which the fishing line is released comes into impact contact with the sides of the engaging recesses 7e, 7f.

On the sides of the engaging recesses 7e, 7f with which the engaging protrusion 8 comes into impact contact, the end planes 7g and 7i are respectively formed.

When the spool 3 is replaced, as shown in FIG. 9, the spool cover 5, bearing 12, spool shaft 4, spool 3, bearing 13 and engaging protrusion 8 composed of a pin fixed to the spool shaft 4, are pulled out.

As described above, the engaging protrusion 8 rotated in the direction in which the fishing line is released comes into impact contact with the engaging recesses 7e, 7f, and the end planes 7g, 7i are respectively formed on the sides of the engaging recesses 7e, 7f. Accordingly, the thickness of these portions can be increased. Therefore, it is possible to enhance the mechanical strength of the engaging recesses 7e, 7f formed on one end face "a" of the large diameter shaft tube 7a of the pinion 7.

When the mechanical strength of the engaging recesses 7e, 7f is enhanced, the problems can be solved as follows. For example, the edge portion is not deformed or scraped away by an impact force caused when the engaging protrusion 8 collides with the engaging recesses 7e, 7f. Accordingly, the engaging protrusion 8 can be smoothly, perfectly and positively engaged with the pinion engaging recesses 7e, 7f.

When the fishing reel is constructed as described above, edge portions of the engaging recesses 7e, 7f on the side "a" of the pinion 7 can be made thick since the end planes 7g and 7i are formed. Furthermore, it is possible to enhance the mechanical strength of the engaging recesses 7e, 7f. Therefore, while the fishing line releasing condition generated by the oblique surfaces 7h, 7j can be smoothly changed over to the fishing line winding condition, the engaging portion of the engaging recesses 7e, 7f of the pinion 7 with the engaging protrusion 8 is reinforced, and the clutch function can be stably maintained even when the fishing reel is used under a severe condition over a long period of time.

Figure 10:
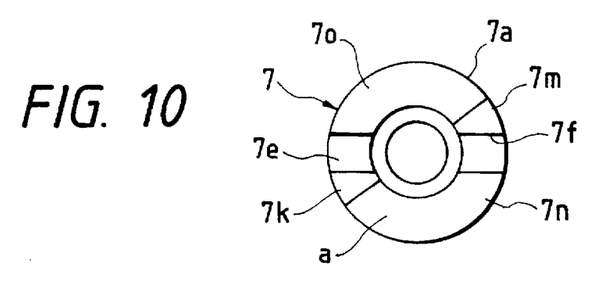
FIG. 10 is an enlarged front view of one end face of the pinon in the first variation of the lengths of the end plane and oblique plane.

FIG. 10 is a view showing a first variation of the lengths of the end plane and the oblique plane. FIG. 10 is an enlarged front view of one end face of the pinion.

In the pinion 7 of the first variation, the end planes 7k, 7m are smaller than the end planes 7g, 7i shown in FIG. 5 of the first embodiment, and the oblique faces 7n, 7o are formed large. Other arrangements are the same as those of the first embodiment.

Figure 11:
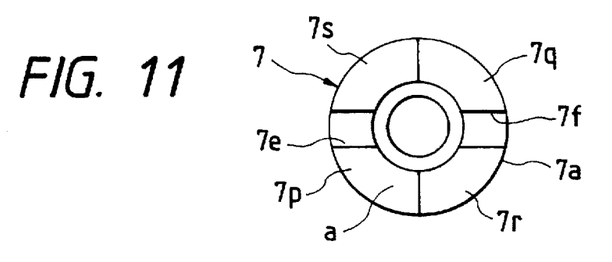
FIG. 11 is an enlarged front view of one end face of the pinion in the second variation of the lengths of the end face and oblique face.

FIG. 11 is a view showing the second variation of the lengths of the end plane and the oblique plane. FIG. 11 is an enlarged front view of one end face of the pinion.

In the pinion 7 of the second variation, the end planes 7p, 7q are larger than the end planes 7g, 7i shown in FIG. 5 of the first embodiment, and the oblique faces 7r, 7s are formed small. Other arrangements are the same as those of the first embodiment.

Figure 12:
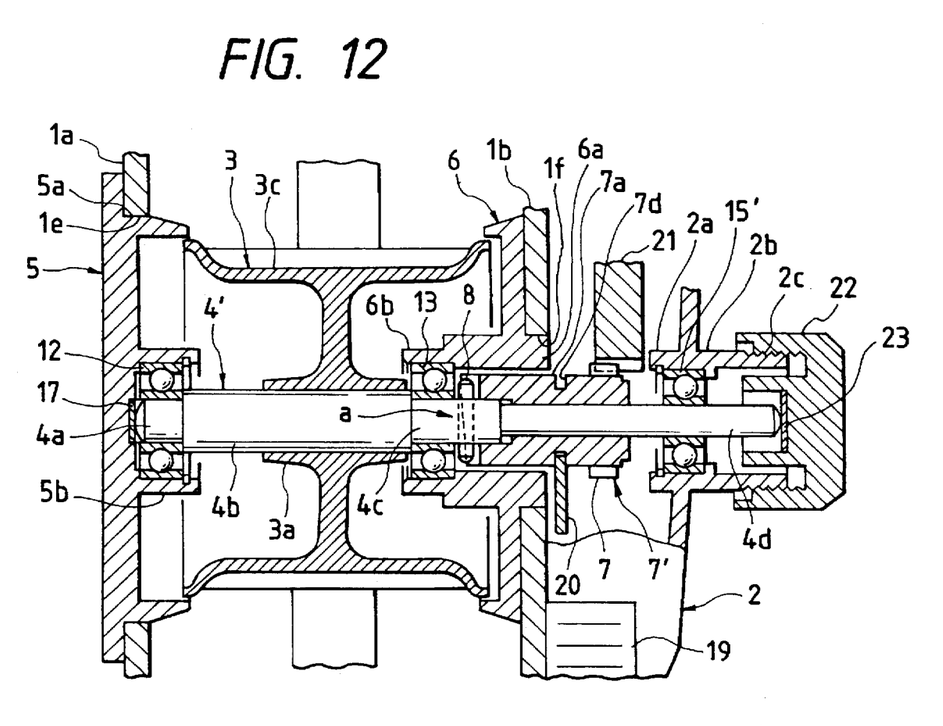
FIG. 12 is an enlarged cross-sectional plan view showing a primary portion of the clutch mechanism in which the spool and the pinion are connected with each other in the variation of the spool shaft.

FIG. 12 is a view showing a variation of the spool shaft. FIG. 12 is an enlarged cross-sectional plan view showing a primary portion of the clutch mechanism in which the spool and the pinion are connected with each other.

In the variation of the spool shaft shown in FIG. 12, instead of the pushing shaft lever 16 movably engaged in the center hole of the pinion 7 of the first embodiment, a small diameter portion 4d is integrally formed at an end of the outward extending end portion 4c of the spool shaft 4', and the pinion 7' is engaged with the outer circumference of the small diameter portion 4d in such a manner that the pinion 7' can be moved in the axial direction.

In the variation of the spool shaft shown in FIG. 12, the bearing 14 of the first embodiment is omitted, and the small diameter shaft tube 7b of the pinion 7 of the first embodiment is also omitted.

The bearing 15' which supports the small diameter portion 4d is smaller than the bearing 15 of the first embodiment. Other arrangements are the same as those of the first embodiment.

Figure 13:
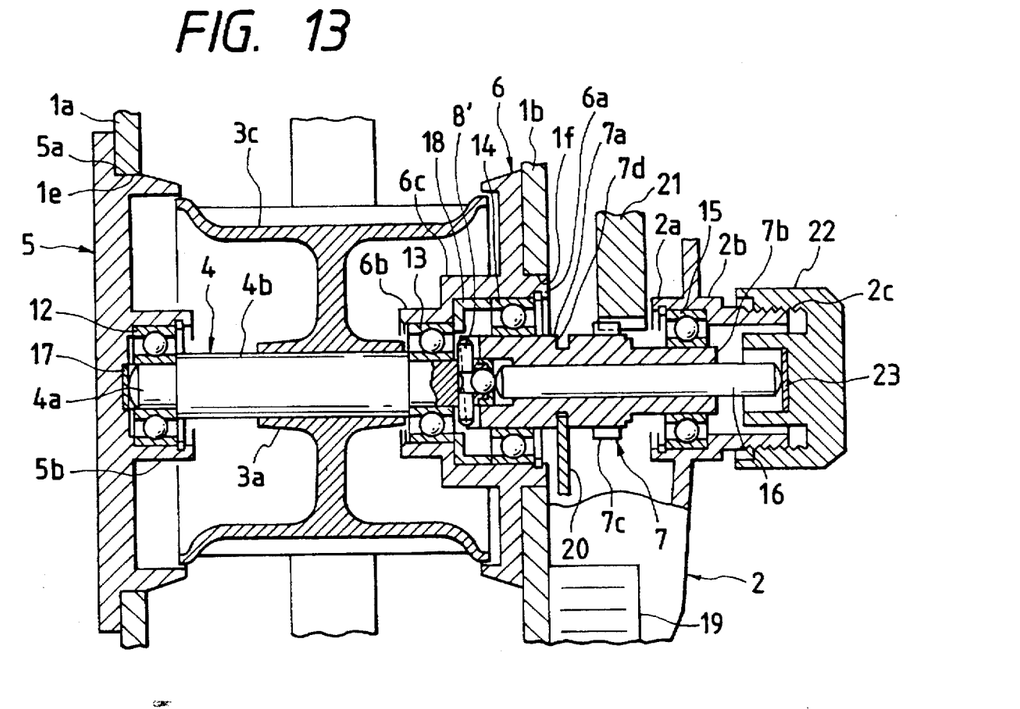
FIG. 13 is an enlarged cross-sectional plan view showing a primary portion of the clutch mechanism in which the spool and the pinion are connected with each other in the variation in which the engaging protrusion is detachably attached to the spool shaft.
Figure 14:
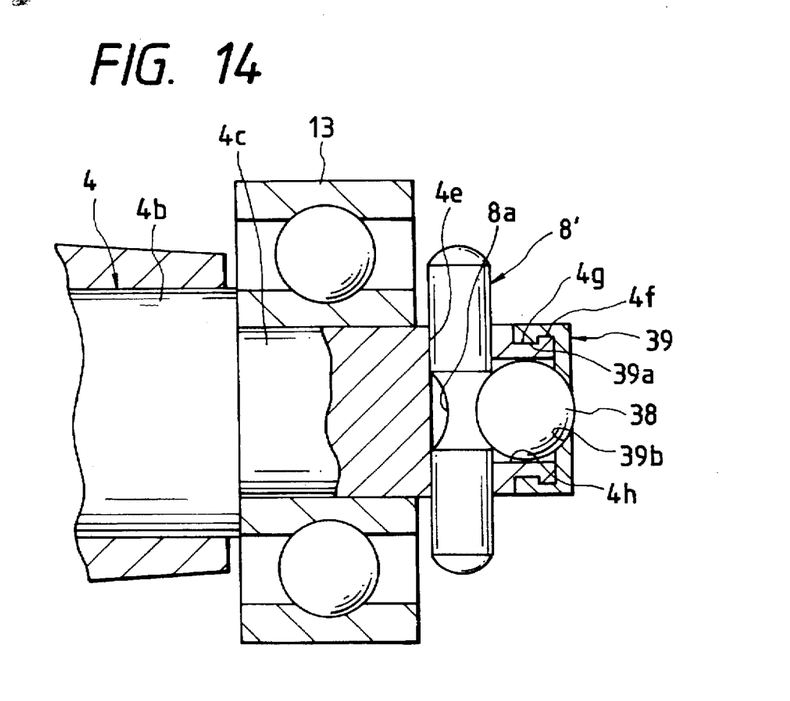
FIG. 14 is a cross-sectional side view showing primary portions of the spool shaft and the engaging protrusion.
Figure 15:
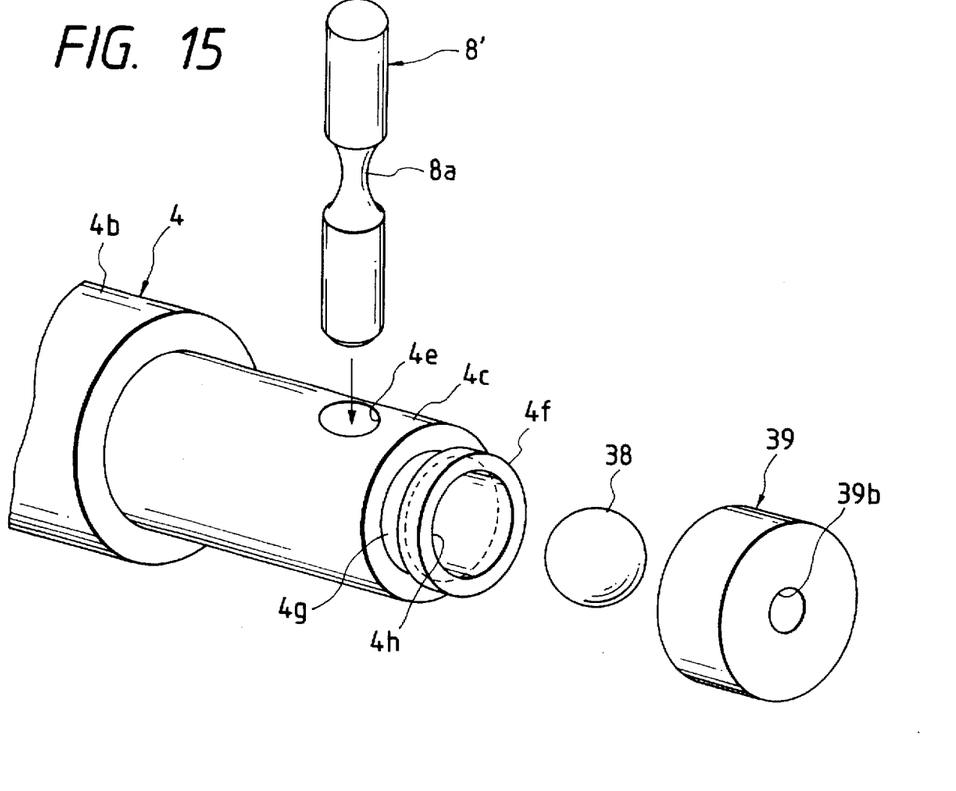
FIG. 15 is an exploded perspective view showing primary portions of the spool shaft and the engaging protrusion.
Figure 16:
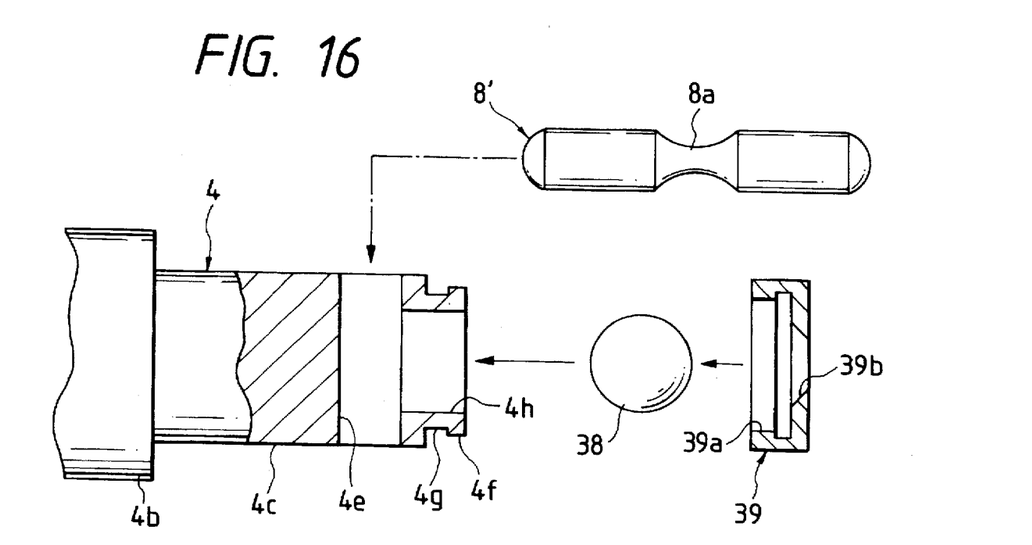
FIG. 16 is an exploded partially cross-sectional side view showing primary portions of the spool shaft and the engaging protrusion.

FIGS. 13 to 16 are views showing a variation in which the engaging protrusion is attached to the spool shaft in such a manner that the engaging protrusion can be freely replaced. FIG. 13 is an enlarged cross-sectional plan view showing a primary portion of the clutch mechanism in which the spool and the pinion are connected with each other. FIG. 14 is a cross-sectional side view showing primary portions of the spool shaft and the engaging protrusion. FIG. 15 is an exploded perspective view showing primary portions of the spool shaft and the engaging protrusion. FIG. 16 is an exploded partially cross-sectional side view showing primary portions of the spool shaft and the engaging protrusion.

A variation in which the engaging protrusion is attached to the spool shaft is arranged as follows. A through-hole 4e perpendicular to the axis of the spool shaft 4 and a small diameter portion 4f are provided in the outwardly extending end portion 4c of small diameter of the spool shaft 4. A circumferential groove 4g and a center hole 4h are provided on the small diameter portion 4f.

An engaging protrusion 8' is inserted into the through-hole 4e. The engaging protrusion 8' includes a hand-drum-shaped portion 8a in which a diameter of the intermediate portion of the engaging protrusion 8' is reduced.

A ball 38 is inserted into the center hole 4h and contacted with the hand-drum-shaped portion 8a of the engaging protrusion 8'.

A cap 39 is engaged with the outer circumference of the small diameter portion 4f. An inward flange portion 39a of the cap 39 is engaged with the circumferential groove 4g, and a portion of the ball 38 is exposed from a through-hole 39b formed in the cap 39.

An end of the pushing shaft lever 16 comes into contact with the ball 38, a portion of which is exposed from the cap 39.

Other arrangements are substantially the same as those of the first embodiment.

Conventionally, the following technique is disclosed. The engaging protrusion is inserted into a through-hole formed in the spool shaft in a direction perpendicular to the axis, and a lock pin is inserted into a through-hole formed in a direction perpendicular to the engaging protrusion, so that the engaging protrusion can be locked.

When the engaging protrusion is locked in the manner of the conventional example as described above, the through-hole is formed in such a manner that the through-hole crosses the spool shaft, so that the mechanical strength of the spool shaft is lowered. Further, it is impossible to replace the engaging protrusion. In the case of the first embodiment described above, it is also impossible to replace the engaging protrusion. However, in the variation in which the engaging protrusion 8' is detachably attached to the spool shaft 4, it is possible to replace the engaging protrusion by detaching the cap 39 when necessary.

Figure 17:
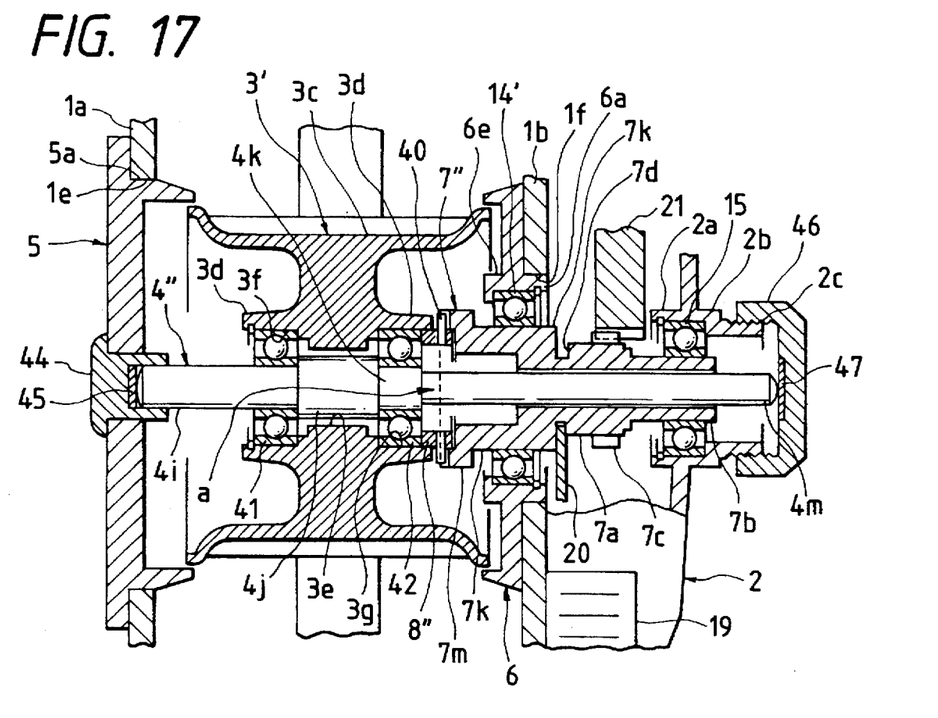
FIG. 17 is an enlarged cross-sectional plan view of a second embodiment, showing a primary portion of the clutch mechanism in which the spool and the pinion are connected with each other.
Figure 18:
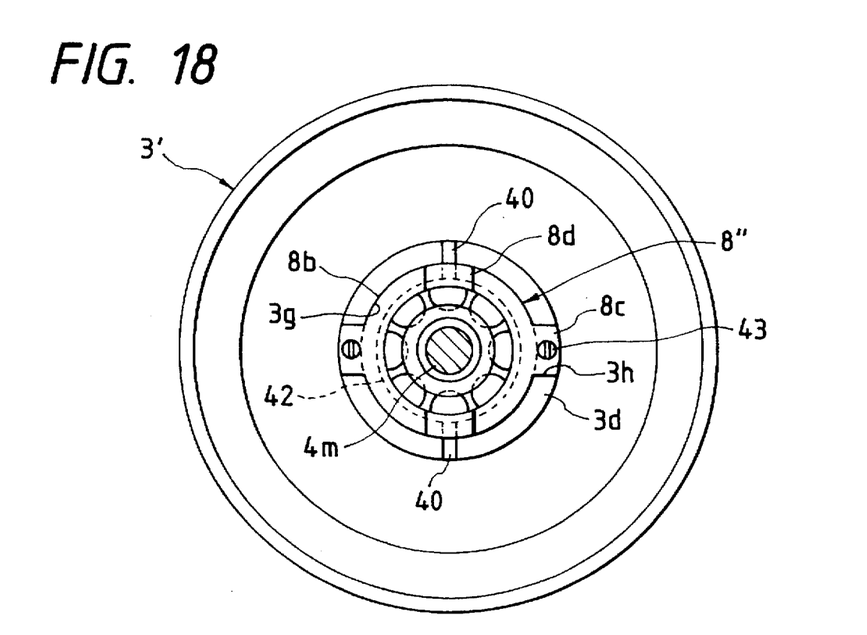
FIG. 18 is a front view showing the other side of the spool and the engaging protrusion holding member.
Figure 19:
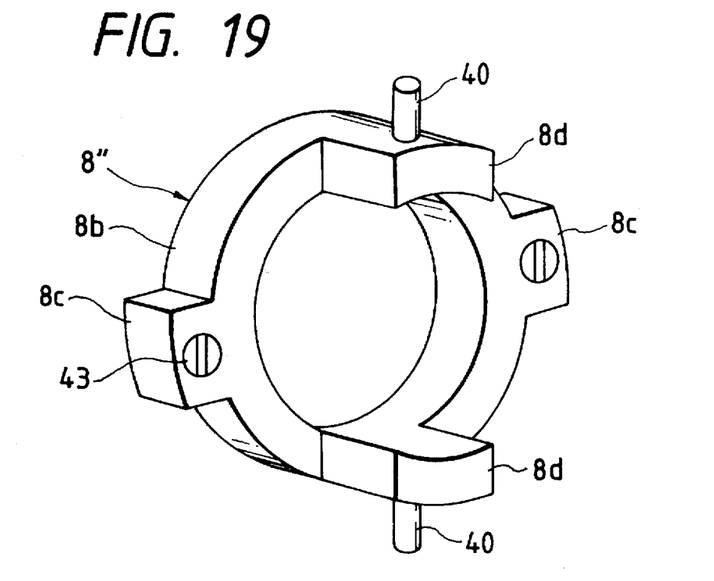
FIG. 19 is a perspective view of the engaging protrusion holding member.
Figure 20:
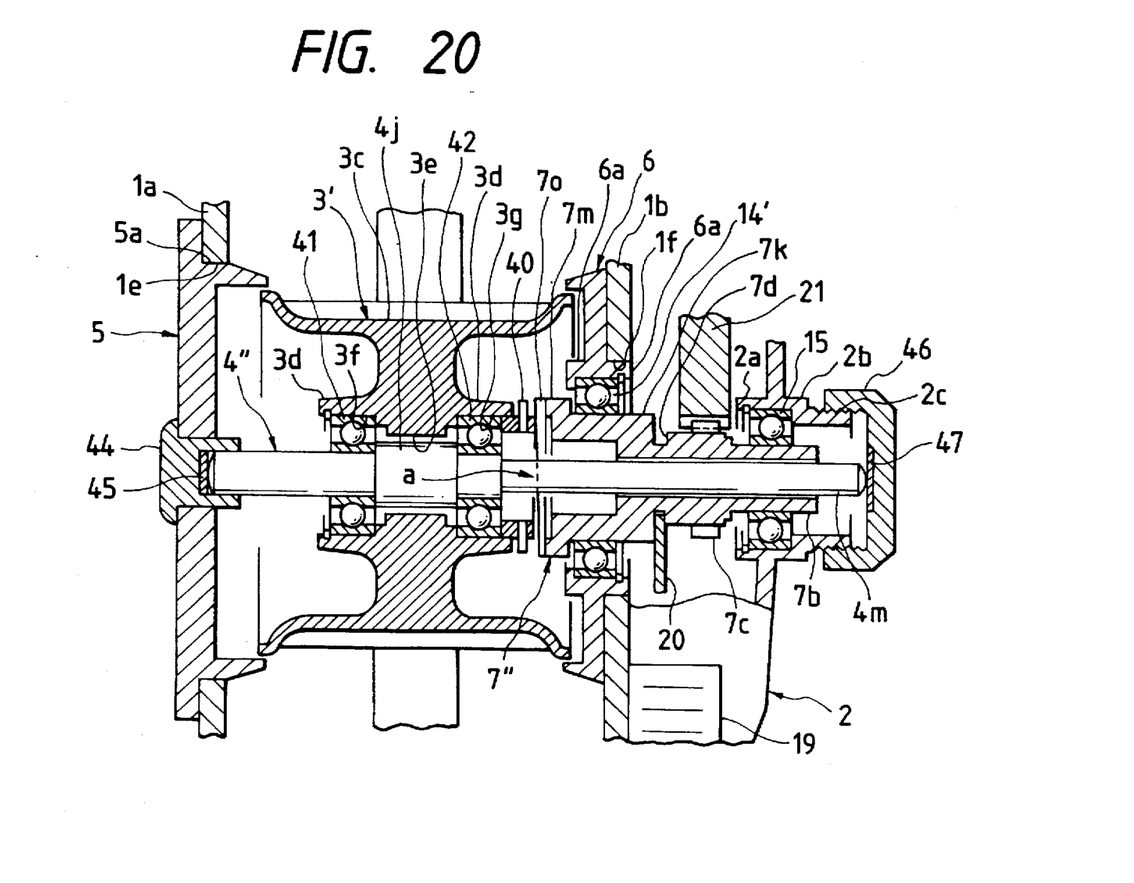
FIG. 20 is an enlarged cross-sectional plan view showing a primary portion of the clutch mechanism in which the spool and the pinion are freely rotated.
Figure 21:
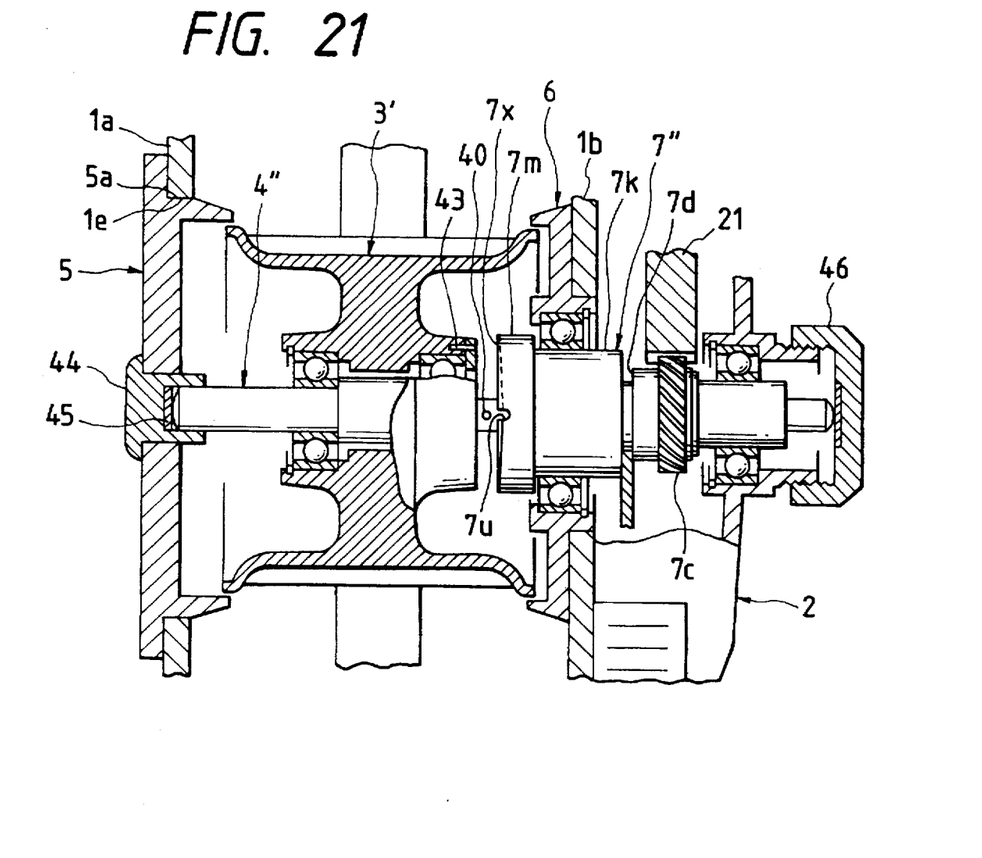
FIG. 21 is an enlarged cross-sectional plan view showing a primary portion in which the pinion of the clutch mechanism is shown in a side view, wherein the spool shaft is rotated in a condition of free rotation by an angle of 90° in the clutch mechanism.

FIGS. 17 to 22 are views showing the second embodiment of the present invention. FIG. 17 is an enlarged cross-sectional plan view showing a primary portion of the clutch mechanism in which the spool and the pinion are connected with each other. FIG. 18 is a front view showing the other side of the spool and the engaging protrusion holding member. FIG. 19 is a perspective view of the engaging protrusion holding member. FIG. 20 is an enlarged cross-sectional plan view showing a primary portion of the clutch mechanism in which the spool and the pinion are freely rotated. FIG. 21 is an enlarged cross-sectional plan view showing a primary portion in which the pinion of the clutch mechanism is shown in a side view, wherein the spool shaft is rotated in a condition of free rotation by an angle of 90° in the clutch mechanism. FIG. 22(a) is an enlarged front view of one end face of the pinion. FIG. 22(b) is an enlarged plan view of the pinion.

In the second embodiment, an engaging protrusion holding member 8" is fixed to the other side of the spool 3', and a pair of engaging protrusions 40 fixed to the engaging protrusion holding member 8" are engaged with and disengaged from the pinion 7".

A center hole 3e is formed in the spool 3' at the center shaft portion 3d. Recesses 3f, 3g are formed on both sides of the center hole 3e. Bearings 41, 42 are provided, respectively, in the recesses 3f, 3g. A spool shaft 4" is supported by the bearings 41, 42.

A cylindrical portion 8b of the engaging protrusion holding member 8" is engaged with the recess 3g outside the bearing 42.

As shown in FIGS. 17 to 19, the engaging protrusion holding member 8" includes a cylindrical portion 8b, a pair of supporting portions 8c protruding outside the outer circumference from the cylindrical portion 8b, and a pair of holding portions 8d of a pair of engaging protrusions 40. The holding portions 8d protrude from the cylindrical portion 8b in the axial direction.

As shown in FIG. 17, the engaging protrusion holding member 8" of the center shaft portion 3d of the spool 3' is attached to the right side of the spool. As shown in FIG. 18, on the right of the spool, a pair of recesses 3h are formed. A pair of supporting portions 8c are inserted into the recesses.

The pair of supporting portions 8c inserted into the pair of recesses 3h are fixed by screws 43.

The spool shaft 4" includes a small diameter portion 4i, a large diameter portion 4j, another small diameter portion 4k, and still another small diameter portion 4m.

The aforementioned bearings 41, 42 are respectively engaged with the small diameter portions 4i, 4k in such a manner that the large diameter portion 4j is interposed between them.

The small diameter portion 4i of the spool shaft 4" is inserted into and engaged with the bearing 44 fixed to the spool cover 5 attached to the side frame 1a and comes into contact with the thrust bearing 45.

The small diameter portion 4m is inserted into the center hole of the pinion 7", and the other end of the small diameter portion 4m is contacted with the thrust bearing 47 provided inside the adjusting knob 46 which is screwed to the outer circumferential screw portion 2c of the bearing 2b of the right side plate 2.

The pinion 7" includes a large diameter shaft tube 7a, a small diameter shaft tube 7b, and two other large diameter shaft tubes 7k, 7m which are arranged stepwise. Pinion teeth 7c and circumferential groove 7d are formed on the outer circumference of the large diameter shaft tube 7a.

Figure 22A:
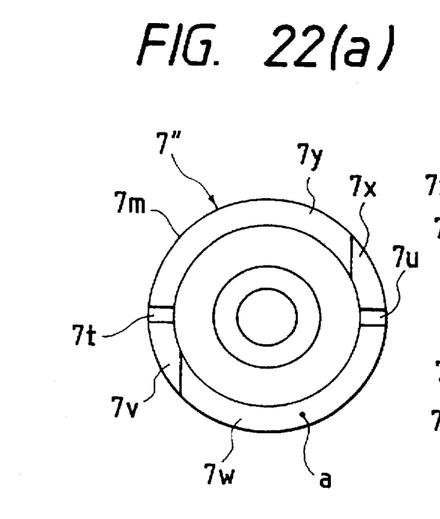
FIG. 22(a) is an enlarged front view of one end face of the pinion.

A pair of U-shaped engaging recesses 7t, 7u are formed on one end face "a" of the large diameter shaft tube 7m. The recesses 7t, 7u form part of the clutch mechanism B, and they are arranged perpendicular to the axis of the spool shaft 4.

Figure 22B:
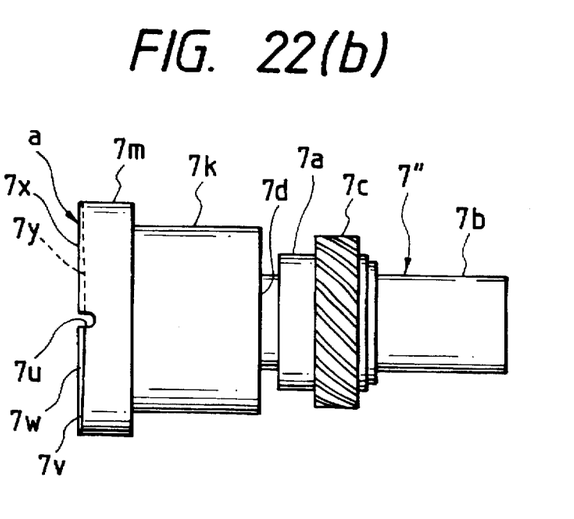
FIG. 22(b) is an enlarged plan view of the pinion.

As shown in FIGS. 21 and 22, a first end plane 7v and a first oblique plane 7w are formed to extend continuously between the engaging recesses 7t, 7u on one side of the end face, and a second end plane 7x and a second oblique plane 7y are formed to extend continuously between the engaging recesses 7t, 7u on the other side of the same end face "a".

The pair of engaging protrusions 40 of the engaging protrusion holding member 8" are engaged with and disengaged from the engaging recesses 7t, 7u of the pinion 7" when the operating plate 20 is operated by the clutch operating lever 19, and the operating plate 20 is engaged in the circumferential groove 7d.

The pinion 7" is rotatably supported by the bearings so that it can be moved in the axial direction as follows. The shaft tube 7k is supported by the bearing 14' attached to the inside of the cylindrical portion 6e of the spool cover 6, and the small diameter shaft tube 7b is supported by the bearing 15 attached to the right side plate 2.

Other arrangements are the same as those of the first embodiment described before.

In the second embodiment, when the clutch is changed over from the clutch-on condition to the clutch-off condition in which the spool can be freely rotated, the operating plate 20 is operated by the clutch operating lever 19. Then, as shown in FIGS. 20 and 21, the pinion 7" is moved in the axial direction, and the engaging recesses 7t, 7u of the pinion 7" are disengaged from the pair of engaging protrusions 40 of the engaging protrusion holding member 8".

When the clutch is changed over from the clutch-off condition in which the spool can be freely rotated, to the clutch-on condition, the operating plate 20 is operated by the clutch operating lever 19. Then, as shown in FIG. 17, the pinion 7" is moved in the axial direction, and the engaging recesses 7t, 7u of the pinion 7" are inserted into and engaged with the pair of engaging protrusions 40 of the engaging protrusion holding member 8".

At this time, the pair of engaging protrusions 40, which are rotating or stopping, come into contact with a set of the end planes 7v, 7x or a set of the oblique planes 7w, 7y formed on the end face "a" of the shaft tube 7m of the pinion 7". Then the pair of engaging protrusions 40 are inserted into and engaged with the engaging recesses 7t, 7u.

When the pair of engaging protrusions 40 are inserted into and engaged with the engaging recesses 7t, 7u, the pair of engaging protrusions 40, which are rotating in a direction in which the fishing line can be released, come into impact contact with one side of the engaging recesses 7t, 7u. The aforementioned end planes 7v and 7x are respectively formed on the side of the engaging recesses 7t, 7u which come into impact contact with the pair of engaging protrusions 40.

In the arrangement of the above explanation, the rolling type one-way clutch D is assembled onto the outer circumference of the drive shaft 9. However, the rolling type one-way clutch D may be omitted.

In the arrangement of the above explanation, the right and left side frames 1b, 1a of the side frame 1, the fixing plate 1c and the finger mounting lever 1d are integrally formed. However, they may be separately formed, and both side frames 1a, 1b may be held in parallel.

The fishing reel of the present invention is arranged as described in detail above. Accordingly, the following effects can be provided. The edge portion of the engaging recess formed on one side of the pinion can be formed into an end plane, the thickness of which is increased. Therefore, it is possible to enhance the mechanical strength of the engaging recess. While the reel is smoothly changed over from a condition in which the fishing line is released by an oblique surface to a condition in which the fishing line is wound, the engaging portion of the engaging recess of the pinion with the engaging protrusion is reinforced. Accordingly, the clutch function can be maintained over a long period of time even when it is used under severe conditions.

What is claimed:

1. A fishing reel comprising:
   a spool rotatably supported between side plates of a reel body and around which a fishing line is wound, said spool comprising a spool shaft;

a drive mechanism for driving said spool, said drive mechanism comprising a rotatably mounted pinion; and a clutch mechanism for transferring a drive force between said drive mechanism and said spool, wherein said clutch mechanism comprises:

an engaging protrusion attached to one of said spool and said spool shaft so as to extend in a direction substantially perpendicular to an axis of rotation of said spool shaft;

a pair of engaging recesses provided in peripheral portions of an end face of said pinion, said engaging recesses being arranged substantially perpendicular to an axis of rotation of said pinion, wherein when said pair of engaging recesses are engaged and disengaged with said engaging protrusion, said clutch mechanism is changed over, respectively, between a winding condition in which the fishing line is taken up on said spool and a free rotating condition in which the fishing line is let out from said spool; and a first end plane and a first oblique face arranged to extend continuously between said engaging recesses on one side of the end face of said pinion, and a second end plane and a second oblique face arranged to extend continuously between said engaging recesses on a side of the end face of said pinion opposite the one side.

2. A fishing reel as recited in claim 1, wherein said first end plane and said second end plane comprise increased thickness portions of said pinion, and wherein said first end plane and said second end plane are formed at sides of said engaging recesses that are impacted by said engaging protrusion when said spool is stopped from being rotated in the free rotating condition.

3. A fishing reel as recited in claim 1, wherein said first end plane is smaller in size than said first oblique face when viewed from the end face of said pinion, and wherein said second end plane is smaller in size than said second oblique face when viewed from the end face of said pinion.

4. A fishing reel as recited in claim 1, wherein the first end plane is substantially equal in size to said first oblique face when viewed from the end face of said pinion, and wherein said second end plane is substantially equal in size to said second oblique face when viewed from the end face of said pinion.

5. A fishing reel as recited in claim 1, wherein a through-hole is formed in said spool shaft so as to extend in a direction substantially perpendicular to the axis of rotation of said spool shaft, a center hole is formed in an end face of said spool shaft so as to communicate with said through hole, and said engaging protrusion comprises a pin-shaped member having a reduced diameter intermediate portion, said reduced diameter intermediate portion being aligned with said center hole when said engaging protrusion is positioned inside said through-hole, said fishing reel further comprising a ball disposed in said center hole and held against said reduced diameter intermediate portion of said engaging protrusion by a cap removably secured to the end face of said spool, a portion of said ball protruding through a hole formed in said cap.

6. A fishing reel as recited in claim 1, wherein said engaging protrusion comprises two engaging protrusions for engaging respective ones of said engaging recesses, and wherein said clutch mechanism comprises an engaging protrusion holding member, said holding member comprising a cylindrical portion, supporting portions protruding radially from said cylindrical portion for attaching said cylindrical portion to said spool, and a pair of holding portions protruding axially from said cylindrical portion for holding respective ones of said two engaging protrusions.

7. A fishing reel as recited in claim 1, wherein said spool shaft is rotatably supported by one set of bearings, and said pinion is rotatably supported by a different set of bearings.

8. A fishing reel as recited in claim 1, wherein said pinion is a hollow member, and wherein said spool shaft comprises a small diameter portion integrally formed at an end of said spool shaft and received in said pinion so that said pinion is free to move in the axial direction of said spool shaft along said small diameter portion of said spool shaft.

* * * * *